United States Patent
Graves et al.

(10) Patent No.: US 8,463,879 B2
(45) Date of Patent: *Jun. 11, 2013

(54) METHOD AND APPARATUS FOR AUTOMATIC VERIFICATION OF A MACHINE-READABLE MAP OF NETWORKED DEVICES

(75) Inventors: David Graves, Monte Sereno, CA (US); Parvathi Nair, Fremont, CA (US); Margaret Mary Bertsch, Nashville, TN (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2059 days.

This patent is subject to a terminal disclaimer.

(21) Appl. No.: 10/893,617

(22) Filed: Jul. 16, 2004

(65) Prior Publication Data

US 2005/0234683 A1    Oct. 20, 2005

Related U.S. Application Data

(63) Continuation-in-part of application No. 10/827,770, filed on Apr. 19, 2004.

(51) Int. Cl.
*G06F 15/177* (2006.01)
*G06F 9/44* (2006.01)
*H04L 12/28* (2006.01)

(52) U.S. Cl.
USPC .......... 709/220; 709/221; 709/222; 717/104; 717/171; 370/254

(58) Field of Classification Search
USPC ............ 709/220–222; 717/104, 171; 370/254
See application file for complete search history.

(56) References Cited

U.S. PATENT DOCUMENTS

| | | | |
|---|---|---|---|
| 5,742,829 A * | 4/1998 | Davis et al. | 717/178 |
| 5,831,610 A | 11/1998 | Tonelli et al. | |
| 5,980,078 A * | 11/1999 | Krivoshein et al. | 700/1 |
| 6,229,540 B1 * | 5/2001 | Tonelli et al. | 715/735 |
| 6,327,618 B1 | 12/2001 | Ahlstrom et al. | |
| 6,360,255 B1 * | 3/2002 | McCormack et al. | 709/221 |
| 6,393,425 B1 | 5/2002 | Kelly | |
| 6,510,139 B1 | 1/2003 | Yoshida | |
| 6,795,089 B2 * | 9/2004 | Rajarajan et al. | 345/629 |
| 7,152,109 B2 * | 12/2006 | Suorsa et al. | 709/226 |

(Continued)

FOREIGN PATENT DOCUMENTS

WO    WO 96/24211     8/1996
WO    WO 98/48364    10/1998

OTHER PUBLICATIONS

Giuseppe Psaila, et al.; "Adding Semantics to XML"; Mar. 1999; Second Workshop on Attribute Grammars and their Applications (WAGA99); pp. 113-132.

*Primary Examiner* — David Lazaro
*Assistant Examiner* — Farzana Huq (57) ABSTRACT

Embodiments of the invention provide a method and an apparatus for automatic verification of a machine-readable map of networked devices. In one method embodiment, the present invention accesses a machine-readable map. Additionally, validation rules are accessed in a machine-readable format. A validation step is performed, wherein the validation step comprises comparing the validation rules in machine-readable format with the machine-readable map. A report of a result of the validation step is then generated. In so doing, a verification of a machine-readable map of networked devices occurs automatically.

28 Claims, 5 Drawing Sheets

U.S. PATENT DOCUMENTS

| | | |
|---|---|---|
| 2001/0047409 A1 | 11/2001 | Datta et al. |
| 2002/0002704 A1* | 1/2002 | Davis et al. .................... 717/11 |
| 2002/0100036 A1* | 7/2002 | Moshir et al. ................ 717/173 |
| 2002/0191619 A1* | 12/2002 | Shafer .......................... 370/401 |
| 2003/0140128 A1* | 7/2003 | Cox et al. ...................... 709/221 |
| 2004/0006549 A1* | 1/2004 | Mullins et al. ................... 707/1 |
| 2004/0064803 A1 | 4/2004 | Graves et al. |

* cited by examiner

VALIDATION REPORT 430

435 {unique device identifier} Ethernet connection to device of type "switch": map has connections=4, destinations=4 rule specifies connections=4, destinations=2.

METHOD AND APPARATUS FOR AUTOMATIC VERIFICATION OF A MACHINE-READABLE MAP OF NETWORKED DEVICES

RELATED APPLICATIONS

The present application is a Continuation-In-part of the co-pending, commonly owned utility application, U.S. Ser. No. 10/827,770, filed on Apr. 19, 2004, entitled "METHOD AND APPARATUS FOR VERIFICATION OF A MAP OF WIRING AND ATTRIBUTES FOR NETWORKED DEVICES", of Graves, et al., and is herein incorporated by reference and made a part hereof.

TECHNICAL FIELD

The present invention generally relates to network maps. More specifically to a system and method for automatic verification of a machine-readable map of networked devices.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems and switches (as well as other devices). Devices such as computer systems, routers, switches, load balancers, firewalls, and the like, are commonly linked to each other in networks.

In many cases, Traditional in-house data centers consist of a conglomerate of many unique IT environments. Each of the IT environments are grown and managed specific to the needs of their particular environments. As such, computing resources in each of the environments of the in-house data center are in part constantly being replaced, switched around from IT environment to IT environment, removed, added, etc.

Moreover, the IT environments are often patched together to form the in-house data center. As such, the network or data center of the computing resources can be large and complex. This patchwork infrastructure containing the IT environments in the in-house data center creates a number of challenges.

In particular, when an IT environment is being upgraded, replaced, moved, or established, it has become the standard to build, add on, activate, deactivate, remove, or otherwise modify an IT environment or network without specific rhyme or reason. That is, the network would be adjusted and then tested for operational capabilities, thereby resulting in a network that is understood by only a few technicians. Thus, the user becomes dependent on the knowledge of the technician that built the network.

In order to alleviate the dependence on a single or few technicians as well as provide congruity between networks (for both operational and space related reasons), present solutions utilize a network map (e.g., a blueprint) to design or layout the connections, components, and requirements of the network prior to the first physical connection being established. Once a network map is established, the user will then be able to inspect the map to ensure that all the necessary components and connections are accounted for and in correct operational configuration.

However, one deleterious problem with the use of a network map is the complexity of the network map. For example, a network map may have a large number of devices, wherein each device has any number of necessary or available connections. Additionally, the cabling used between devices must be correct. While performing a review of a network map for consistency, a user must manually verify each device and connection. This process is slow, costly, and prone to error. Detrimentally, undetected errors in the network map will lead to improperly connected networks, for which troubleshooting is difficult and expensive.

DISCLOSURE OF THE INVENTION

Embodiments of the invention provide a method and an apparatus for automatic verification of a machine-readable map of networked devices. In one method embodiment, the present invention accesses a machine-readable map. Additionally, validation rules are accessed in a machine-readable format. A validation step is performed, wherein the validation step comprises comparing the validation rules in machine-readable format with the machine-readable map. A report of a result of the validation step is then generated. In so doing, a verification of a machine-readable map of networked devices occurs automatically.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Embodiments of the present invention relate to the automatic verification of a machine-readable map of networked devices. The present description begins with an overview of a network map and one embodiment of a network environment. The details of the network map, rules, and comparison are then described in detail.

In one embodiment, the network map lists each individual network device and the attributes of the device. For example, the attributes of a device may include, but are not limited to, the make, model, type, role, and unique identifier of the device. Additionally, the network map may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable. One exemplary embodiment of a network which results from a network map is shown in FIG. 1.

Figure 1:
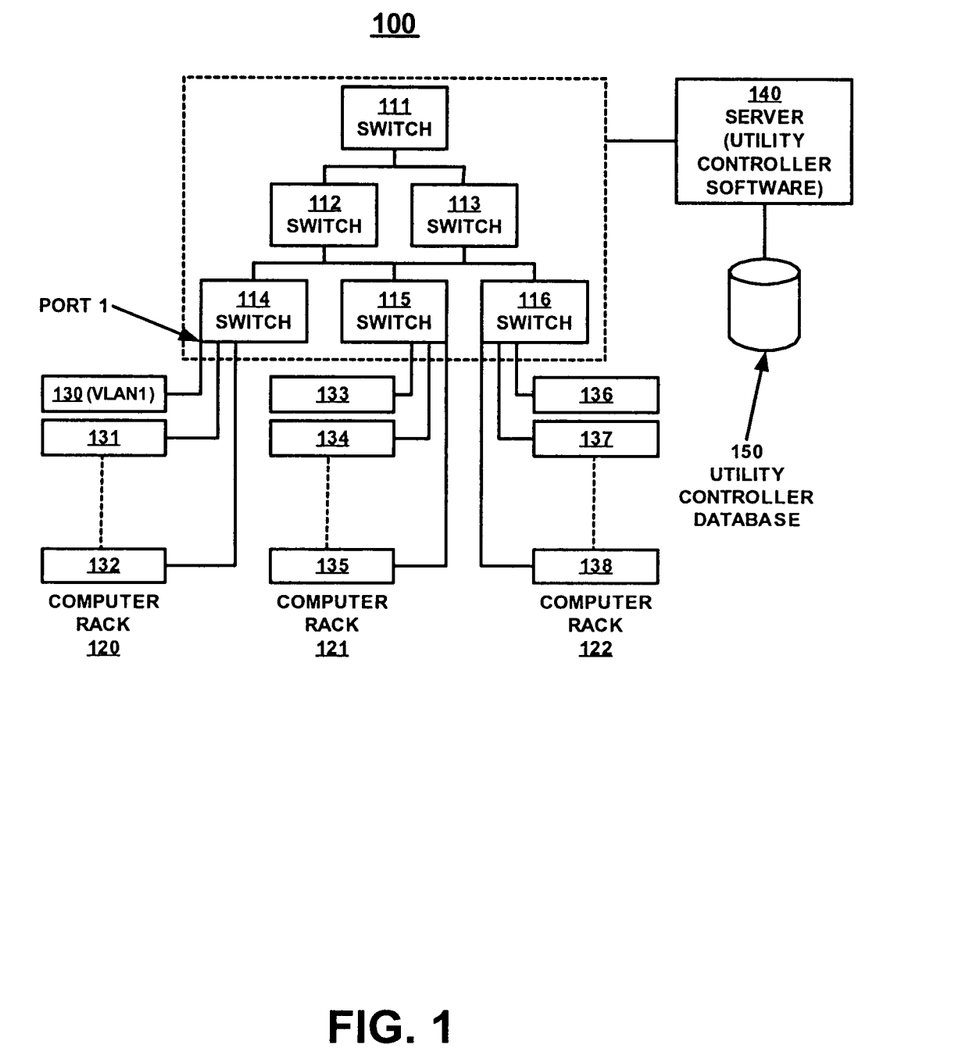
FIG. 1 is a block diagram of an exemplary LAN upon which embodiments of the present invention can be implemented.

With reference now to FIG. 1, a block diagram of an exemplary local area network (LAN) 100 is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein.

In the present embodiment, LAN 100 includes a number of switches 111 through 116, and a number of computers 130-138 that are couplable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of VLANs. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure.

In addition to computer systems and switches, LAN 100 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, the computer-readable network map need not exist in the form conventionally associated with human-readable maps. Furthermore, a network map may include information such as the types of devices in the LAN and a representation of each VLAN. Other information included in a network map includes, but is not limited to: the network or MAC (media access control) address for the resources of the LAN; the port numbers of the configurable devices; the VLAN identifiers associated with each of the port numbers; the socket identifier for each cable connected to each of the resources of LAN; manufacturer and model numbers; and serial numbers.

Figure 2:
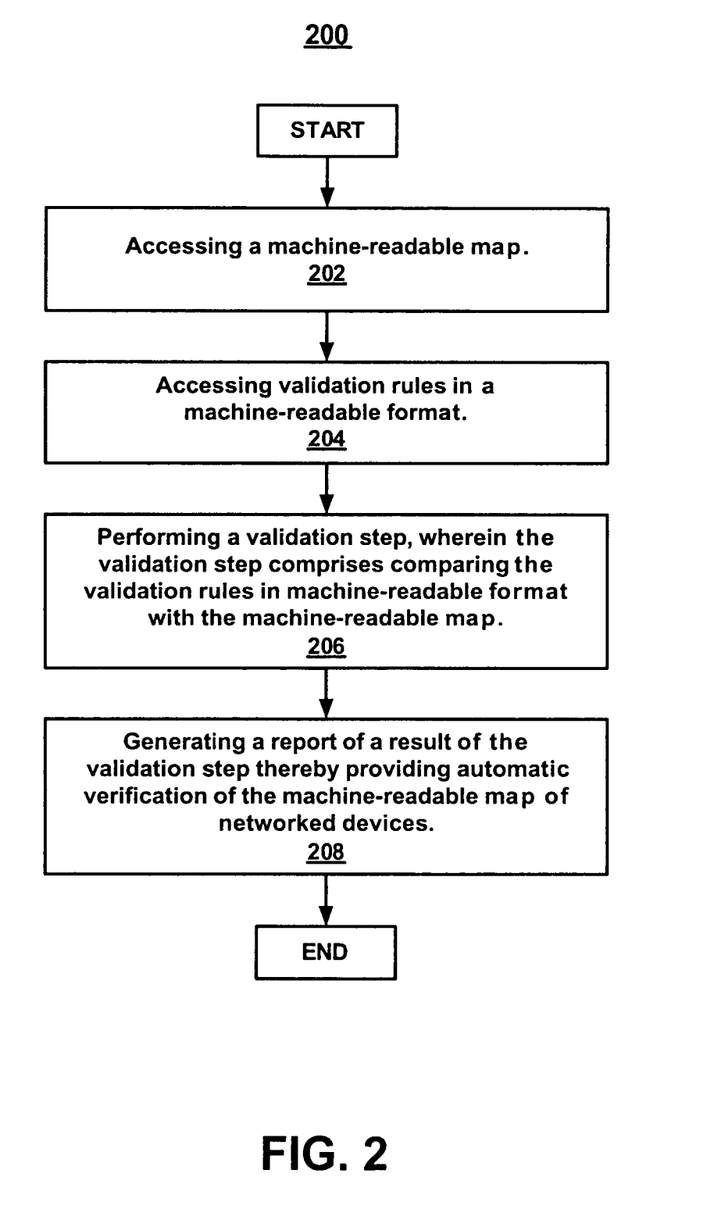
FIG. 2 is a flow chart illustrating steps in a computer implemented method for validating or verifying configuration attributes of computing resources in a UDC, in accordance with one embodiment of the present invention.

Referring now to Flowchart 200 of FIG. 2, an exemplary flowchart of the steps involved in a method for automatic verification of a machine-readable map of networked devices is shown. Specifically, one embodiment allows for the automatic verification of correctness of a machine-readable map of networked devices, including, but not limited to computational servers, switches, routers, firewalls, load balancers, power controllers, and terminal servers. The map defines the attributes of each device and how the physical cabling should be done between devices. A specific grammar is used to define the rules that allow for automatic checking of the map. In another embodiment, the machine-readable map is utilized by a data center (e.g., networked system) on a plurality of devices and plurality of connections to automatically verify the plurality of connections coupling the plurality of devices in the data center.

With reference now to step 202 of FIG. 2, a machine-readable map is accessed. In one embodiment, the machine-readable map is a map of a network, such as LAN 100 that has not yet been built. The machine-readable map may be in any data language that represents physical reality or an expression which can be expressed syntactically. For example, the data language may be extensible mark-up language (XML). The following pseudo-code is an example of a network map in XML which represents a network similar to LAN 100. The network map is abbreviated for increased clarity. In actual usage, the map could contain hundreds of device declarations, and hundreds of thousands of connection declarations.

```
<!DOCTYPE wiringmap SYSTEM "rml.dtd">
<wiringmap>
<!-- The CPU devices (computation servers) -->
<device type="cpu" id="100114201">
    <attribute name="name" value="100114201" />
    <attribute name="make" value="HP" />
    <attribute name="model" value="lp1000r" />
    <attribute name="role" value="nidsmgr" />
    <attribute name="ipaddress" value="not-yet-assigned" />
    <attribute name="user" value="not-yet-assigned" />
    <attribute name="passwd" value="not-yet-assigned" />
</device>
<device type="cpu" id="100114202">
    <attribute name="name" value="100114202" />
    <attribute name="make" value="HP" />
```

```
            <attribute name="model" value="lp1000r" />
            <attribute name="role" value="nidsmgr" />
            <attribute name="ipaddress" value="not-yet-assigned" />
            <attribute name="user" value="not-yet-assigned" />
            <attribute name="passwd" value="not-yet-assigned" />
        </device>
        <device type="cpu" id="100114401">
            <attribute name="name" value="100114401" />
            <attribute name="make" value="HP" />
            <attribute name="model" value="rp2450" />
            <attribute name="role" value="bkupdm" />
            <attribute name="eth0" value="not-yet-assigned" />
        </device>
        <device type="cpu" id="100114402">
            <attribute name="name" value="100114402" />
            <attribute name="make" value="HP" />
            <attribute name="model" value="rp2450" />
            <attribute name="role" value="bkupdm" />
            <attribute name="eth0" value="not-yet-assigned" />
        </device>
        <!-- The Power Controller devices -->
        <device type="pwr" id="100111101">
            <attribute name="role" value="pwr" />
            <attribute name="name" value="100111101" />
            <attribute name="ipaddress" value="not-yet-assigned" />
            <attribute name="make" value="APC" />
            <attribute name="model" value="AP9212" />
            <attribute name="user" value="apc" />
            <attribute name="passwd" value="apc" />
        </device>
        <device type="pwr" id="100111102">
            <attribute name="role" value="pwr" />
            <attribute name="name" value="100111102" />
            <attribute name="ipaddress" value="not-yet-assigned" />
            <attribute name="make" value="APC" />
            <attribute name="model" value="AP9212" />
            <attribute name="user" value="apc" />
            <attribute name="passwd" value="apc" />
        </device>
        <!-- Power cables from power controllers to computation servers -->
        <connection sid="100111102" sport="7" rid="1001 14201"
        rport="p1"></connection>
        <connection sid="100111101" sport="6" rid="1001 14202"
        rport="p1"></connection>
        <connection sid="100111101" sport="8" rid="1001 14401"
        rport="p1"></connection>
        <connection sid="100111102" sport="8" rid="1001 14402"
        rport="p1"></connection>
        <!-- The Terminal Server device provides console access other
        devices -->
        <device type="ts" id="100116001">
            <attribute name="role" value="ignition" />
            <attribute name="name" value="100116001" />
            <attribute name="ipaddress" value="not-yet-assigned" />
            <attribute name="make" value="Cisco" />
            <attribute name="model" value="2621" />
        </device>
        <!-- Console cables from power controllers to terminal server -->
        <connection sid="100111101" sport="s0" rid="100116001"
        rport="1"></connection>
        <connection sid="100111102" sport="s0" rid="100116001"
        rport="2"></connection>
        <!-- Console cables from computation servers to terminal server -->
        <connection sid="100114401" sport="s0" rid="100116001"
        rport="3"></connection>
        <connection sid="100114402" sport="s0" rid="100116001"
        rport="4"></connection>
        <!-- Console cables from network switches to terminal server -->
        <connection sid="100113201" sport="s0" rid="100116001"
        rport="9"></connection>
        <connection sid="100113202" sport="s0" rid="100116001"
        rport="10"></connection>
        <!-- The Network Switches -->
        <device type="sw" id="100113201">
            <attribute name="role" value="tier3" />
            <attribute name="name" value="100113201" />
            <attribute name="ipaddress" value="not-yet-assigned" />
            <attribute name="make" value="Cisco" />
            <attribute name="model" value="3524" />
            <attribute name="user" value="root" />
            <attribute name="passwd" value="root" />
        </device>
        <device type="sw" id="100113202">
            <attribute name="role" value="tier3" />
            <attribute name="name" value="100113202" />
            <attribute name="ipaddress" value="not-yet-assigned" />
            <attribute name="make" value="Cisco" />
            <attribute name="model" value="3524" />
            <attribute name="user" value="root" />
            <attribute name="passwd" value="root" />
        </device>
        <!-- Ethernet cables from computation servers to network switches -->
        <connection sid="100114401" sport="eth0" rid="100113201"
        rport="1/2">
        </connection>
        <connection sid="100114402" sport="eth0" rid="100113202"
        rport="1/2">
        </connection>
        <!-- Ethernet cables connections from power controllers to network
        switches -->
        <connection sid="100111101" sport="eth0" rid="100113201"
        rport="1/1">
        </connection>
        <connection sid="100111102" sport="eth0" rid="100113202"
        rport="1/1">
        </connection>
        <!-- Ethernet cables from computation servers to network switches -->
        <connection sid="100114201" sport="eth0" rid="100113201"
        rport="1/7">
        </connection>
        <connection sid="100114202" sport="eth0" rid="100113202"
        rport="1/7">
        </connection>
        <!-- Ethernet cable from the terminal server to the network switch -->
        <connection sid="100116001" sport="eth0" rid="100113201"
        rport="1/8">
        </connection>
    </wiringmap>
```

With reference now to step 204 of FIG. 2, in one embodiment, validation rules in a machine-readable format are accessed. In general, the validation rules are a collection of validation rules in a machine-readable format, such as, but not limited to an XML grammar having rules and rule clauses, and where each of the rule clauses can further be combined into complex rules.

One version of the validation rules may include device attribute declarations that provide a contextual framework for the definition of the rules containing one or more of the clauses described herein. For example, a declaration of the TYPE of a device, e.g., <type name="server">, or a declaration of the MAKE of a device, e.g., <make name="hp">, or a declaration of the MODEL of a device, e.g., <model name="1 p1000">, or a declaration of the ROLE of a device, e.g., <role name="management">.

The validation rules may also include device attribute rules that define the required values for device attributes. For example, Where required attribute has only one valid value, e.g., <attributerule name="make" value="hp">, or where the required attribute value is read from a set of names separated by commas, e.g., <attributerule name="make" value="hp, cisco">

<attributerule name="model" value="3524,2950,6509">

<attributerule name="role" value="resource, management">.

The validation rules may also include connection rules containing one or more of the following clauses, defining the requirements for a particular device's connections. For example, A declaration of the TYPE of a connection, e.g., <connectionrule type="ethernet" ...>, A requirement for the number of CONNECTIONS to a device. For example, Where the number of connections is a single numeric value, e.g., <connectionrule connections="3" ... >

Where the number of connections is a range of values, e.g., <connectionrule connections="2-26" ... >

Where the number of connections is a set of values separated by commas, e.g., <connectionrule connections="4,8,12,16" ... >

Where the number of connections is a set of ranges separated by commas, e.g., <connectionrule connections="1-4, 9-12" ... >

Where the number of connections is a set of ranges and values separated by commas, e.g., <connectionrule connections="1-4, 6, 9-12, 18" ... >

A requirement for the number of DESTINATIONS for connections, for example:

Where the number of destinations is a single numeric value, e.g., <connectionrule destinations="1" ... >

Where the number of destinations is a range of values, e.g., <connectionrule destinations="2-3" ... >

A requirement on attributes of the destination device in a connection rule, for example:

Where a particular device TYPE is required, e.g., <destination name="type" value="switch">

Where the destination device TYPE is read from a set of names separated by commas, e.g., <destination name="type" value="switch, router"/>

Where a particular device ROLE is required, e.g., <destination name="role" value="management"/>

Where the destination device ROLE is read from a set of names separated by commas, e.g., <destination name="role" value="tier1, tier2"/>

Figure 3:
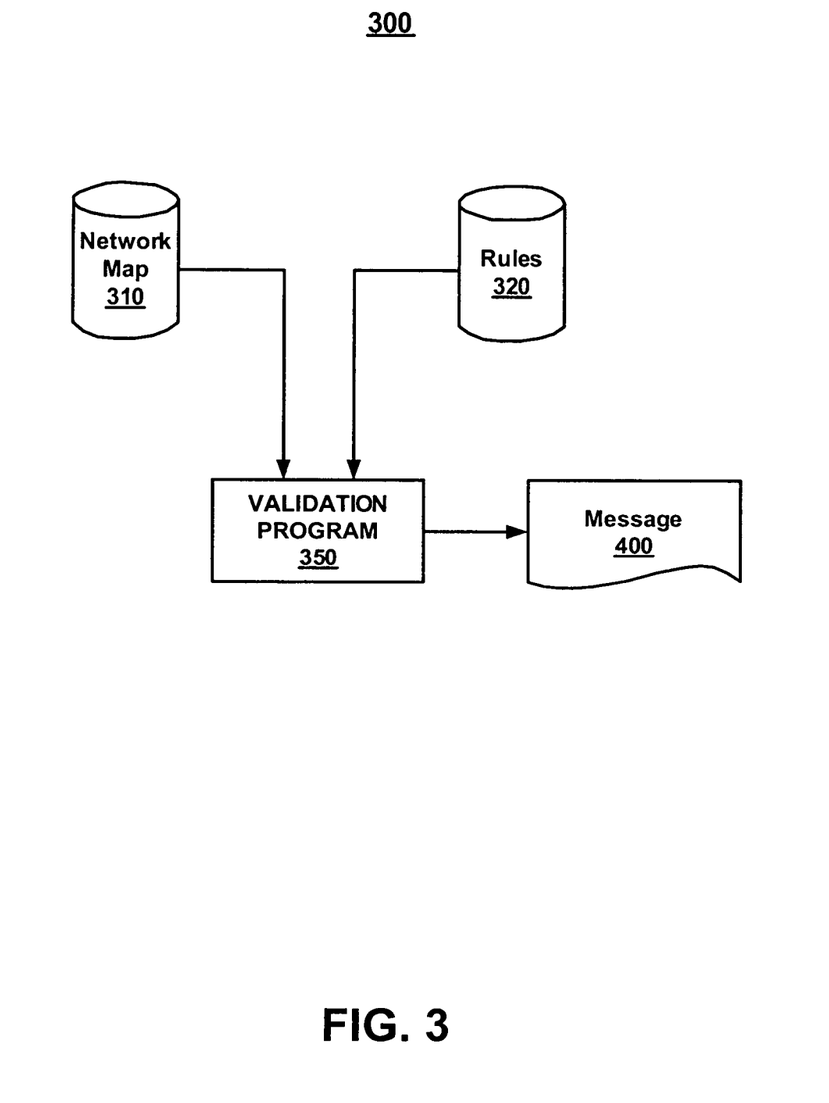
FIG. 3 is a data flow diagram illustrating the flow of information between several elements of a system that reside within a UDC, in accordance with one embodiment of the present invention.

With reference now to step 206 of FIG. 2 and to FIG. 3, a validation step is performed, wherein the validation step comprises comparing the validation rules in machine-readable format with the machine-readable map. In one embodiment, the validation is performed by a program that reads the network map and the validation rules.

With reference to FIG. 3, a data flow diagram illustrating the flow of information between several elements of a system 300 in accordance with one embodiment of the present invention. The system 300 provides for the verification of configuration attributes in a network of computing devices. By way of illustration only, the system 300 can reside on the same computing system as the network map 310 and the rules 320, or the system 300 may reside on a plurality of computing systems wired or wirelessly in contact therewith.

The system 300 is comprised of a validation program 350 that is coupled to a network map 310 and a set of rules 320. The validation program 350 is a semantic comparator that validates a machine language, e.g., XML, data model using semantics rules, thereby significantly reducing the costs associated with programming and maintenance of the network map data model. For example, the network map 310 in XML can validate itself syntactically. That is, the network map 310 code can self-check to ensure correct use of language (e.g., the table is on the ceiling.) However, the network map 310 does not contain the level of code required to check the statement semantically (e.g., the table is on the floor).

Therefore, instead of inundating the network map 310 (and thus every network map) with a large set of semantics (e.g., rules 320), the rules 320 are written in a different set of code and the validation program 350 applies the rules 320 to the map 310 code. Thus, not only is the file size of the network map 310 significantly reduced, the rules 320 may be applied to a plurality of network maps. Moreover, due to the single copy of the rules 320, if a change to the rules 320 is necessary instead of having to update every network map 310 a single change to the rules 320 is performed at one location. The validation program can then be set to retest the network map 310 (or plurality of network maps) against the new rule set.

The network map 310 is one embodiment of a machine-readable network map. As described herein, the information contained within the network map includes configuration attributes. The machine-readable map may be in any data language that represents physical reality, or an expression which can be expressed syntactically. For example, the data language may be extensible mark-up language (XML).

As stated herein, the configuration attributes contained within the network map 310 are associated with each of the computing devices utilized therein, e.g., the type of device. For example, the type of device may include, but should not be limited to: switches, computers, load balancers, and firewalls, etc. In addition, another configuration attribute provides the network address for determining the network pathway to reach a specific computing device, in another embodiment. Further, other device specific representations of configuration attributes may include, but are not limited to the following: name, device make, model, serial number, MAC addresses, software version, and firmware version, etc.

In one case, the configuration attributes that are associated with the computing devices of the map 310 are impermanent, and completely updateable or capable of being changed. For example, software applications and/or firmware will be loaded onto a particular computing resource and can be changed or updated according to the needs of a user.

In another case, the configuration attributes that are associated with computing devices of the map 310 are permanent and are not capable of being changed. For example, permanent configuration attributes for a particular computing resource include, but are not limited to the following: the manufacturer, the model, how many ports are included in the computing resource, serial number, etc.

In one embodiment, the information contained within the rules 320 includes device validation. For example, the rules are organized into four types. They are rules specified at the type level (which apply to all makes and models), rules specified at the make level (which apply to all models), rules specified at the model level (which apply only to that model), and rules specified at the role level (which apply to all makes and models that match the role name).

For example, in one embodiment, a server rp5470 on the network has the following rules. Although the rules are stated herein, any number of other rules may be added, or rules may be removed without affecting the operation of the validation program 350.

```
<!--
    currently rp5470 will only act as resource pool servers.
Therefore, all model-specific rules are required.
-->
<model name="rp5470">
    <rules type="required">
        <attributerule name="role" value="RPS/>
        <!--
            rp5470 needs at least 2 power feeds to separate power sources,
but can have a max of 3.
        -->
        <connectionrule type="power" connections="2-3"
        destinations="2-3">
            <destination name="type" value="pwr"/>
```

-continued

```
    </connectionrule>
    <!--
        serial connection to terminal server
        should be present for rp5470
    -->
    <connectionrule type="serial" connections="1">
        <destination name="type" value="ts"/>
    </connectionrule>
    <!--
        rp5470 has 2 ethernet (1000baseT) connections to 2 tier1/tier2
switches (depending on UDC configuration options)
    -->
    <connectionrule type="Ethernet"
        connections="2" destinations="2">
        <destination name="type" value="sw"/>
        <destination name="role" value="plsg"/>
    </connectionrule>
  </rules>
</model>
```

In another embodiment, the plurality of rules applies to policy constraints that are put onto the computing resources in the LAN or UDC. For example, in a particular UDC, one policy constraint is that only specific models (e.g., those manufactured by corporation X) of computing resources that provide a particular function (e.g., firewalls) will be used.

In general, the validation program 350 begins by reading the network map outlining a plurality of configuration attributes for a plurality of computing resources that are interrelated in a network. The map provides configuration attributes for each of the available computing resources that are included or associated with the network.

Validation program 350 then accesses the plurality of rules 320 and applies every one of the rules 320 to every applicable device and connection in the network map 310. As described previously, the rules may be physical rules, compatibility rules, or policy rules, to name a few. As an example, one physical rule may state the number of (I/O) ports for a particular computing resource. Another policy rule may state that only routers from a particular corporation may be used in the network. Still another physical rule indicates that for compatibility, only a specific group of routers can be used with a particular switch in the network.

In one embodiment, the plurality of rules 320 are applied to physical constraints of each of the computing resources in the pool within the LAN or UDC. For example, on a particular computing resource (e.g., a virtual farm), only two input/output (I/O) ports exist on the computing resource. In that case, a physical constraint associated with that computing resource is the fact that no more than two cables can be plugged into the computing resource. As such, a virtual farm on the map having a computing resource with three I/O ports cannot use a computing resource that only has two computing resource.

The present embodiment continues by determining if the plurality of network map configuration attributes comply with the plurality of rules. For instance, for each device configuration attribute that is received from the network map 310, the validation program 350 checks to see if the network map configuration attributes of the device comply with those rules in the plurality of rules 320 that pertain to the computing resource being verified. For example, the present embodiment may check to see if a particular computing resource as disclosed by the network map configuration attribute has the correct number of inputs, as set forth by a rule in the plurality of rules 350 that governs the network.

Moreover, the validation program 350 benefits from a redundancy issue. For example, not only is device A checked to see a destination to device B, device B is later checked for an input from device A or a destination to device A. Thus, if a rule regarding device A to device B is overlooked (e.g., not in rules 320 file), when device B is checked a different rule may recapture the illegal destination/connection of device B to device A.

With reference now to step 208 of FIG. 2, a report of the result of the validation step is generated thereby providing automatic verification of the machine-readable map of networked devices. For example, a plurality of messages detailing results from comparing the network map configuration attributes to the rules attributes is generated. In this way, the generated message indicates whether the network map configuration attributes of the computing resources in the network are correctly placed.

Figure 4:
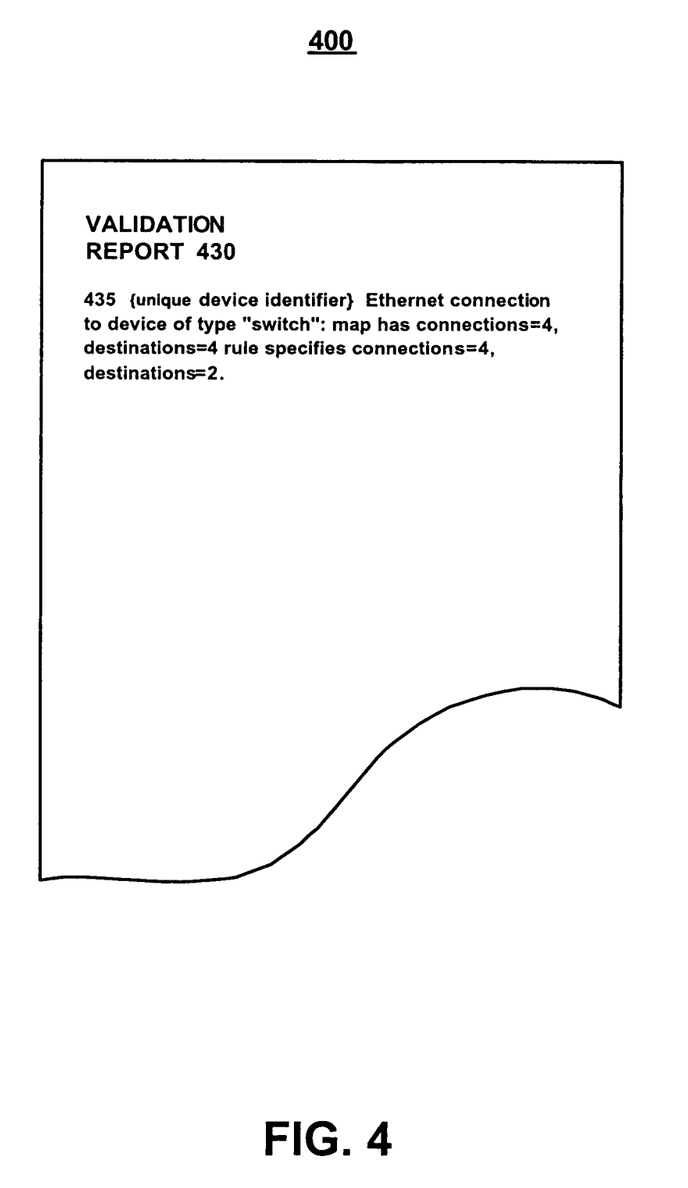
FIG. 4 is a report of verification results in accordance with one embodiment of the present invention.

The validation program 350 performs the validation or verification of the configuration attributes of the network map 310 in conjunction with the rules 320. The validation program 350 also generates a message report 400 that lists the results of the verification from the validation program 350. In one embodiment, the report 400 contains a message listing each instance where the network map 310 configuration attributes differ from the rules 320 attributes.

The validation program 350 continues by generating a separate exception message for each of the plurality of network map 310 configuration attributes that are in violation of the plurality of rules 320. In particular, an exception message is generated that relationally lists the network map 310 configuration attribute that is in violation and a reference to the corresponding rule that the actual configuration attribute is violating. That is, a natural language error message can be automatically generated by the validation program 350. For example, the complex rule:

```
<type name="server">
    <make name="hp">
        <model name="rp7400">
            <connectionrule type="Ethernet"
                connections="4" destinations="2">
            <destination name="type" value="switch">
```

The following natural language error message could be automatically generated upon discovery of an HP rp7400 server in the network map 310 where the four Ethernet cables were connected to four different destination switches, in violation of the above rule:

{unique device identifier} Ethernet connection to device of type "switch": map has connections=4, destinations=4 rule specifies connections=4, destinations=2.

By using the automated process, correctness of a network map 310 can be verified in much less time, at greatly reduced expense, compared to visual inspection by a technician. Moreover, the process can be run repeatedly, at low expense, to allow early discovery of problems. Additionally, the validation program 350 has the advantage of discovering and reporting each instance of an incorrectly defined device attribute or device connection in the network map 310, which may contain hundreds of devices and thousands of connections.

Referring now to FIG. 4, a report 400 lists verification results in accordance with one embodiment. The report 400 illustrates a network error message. The validation report 430 message 435 indicates a natural language error message that is automatically generated upon discovery of an HP rp7400 server in the network map 310 where the four Ethernet cables were connected to four different destination switches, in violation of the above exemplary rule.

{unique device identifier} Ethernet connection to device of type "switch": map has connections=4, destinations=4 rule specifies connections=4, destinations=2.

The text of message 435 allows a technician to review the network map and correct the deficiencies accordingly without having to spend a lot of time searching for the device due to the use of the unique device identifier in the result. Moreover, the technician also receives the problem with the device (e.g., too many destinations) and can redesign the map accordingly. Therefore, a great amount of time is saved. Due to the verification operation being performed automatically by a computing system, the verification may be run throughout the design of the network map providing near real-time feedback to the network map designer.

Figure 5:
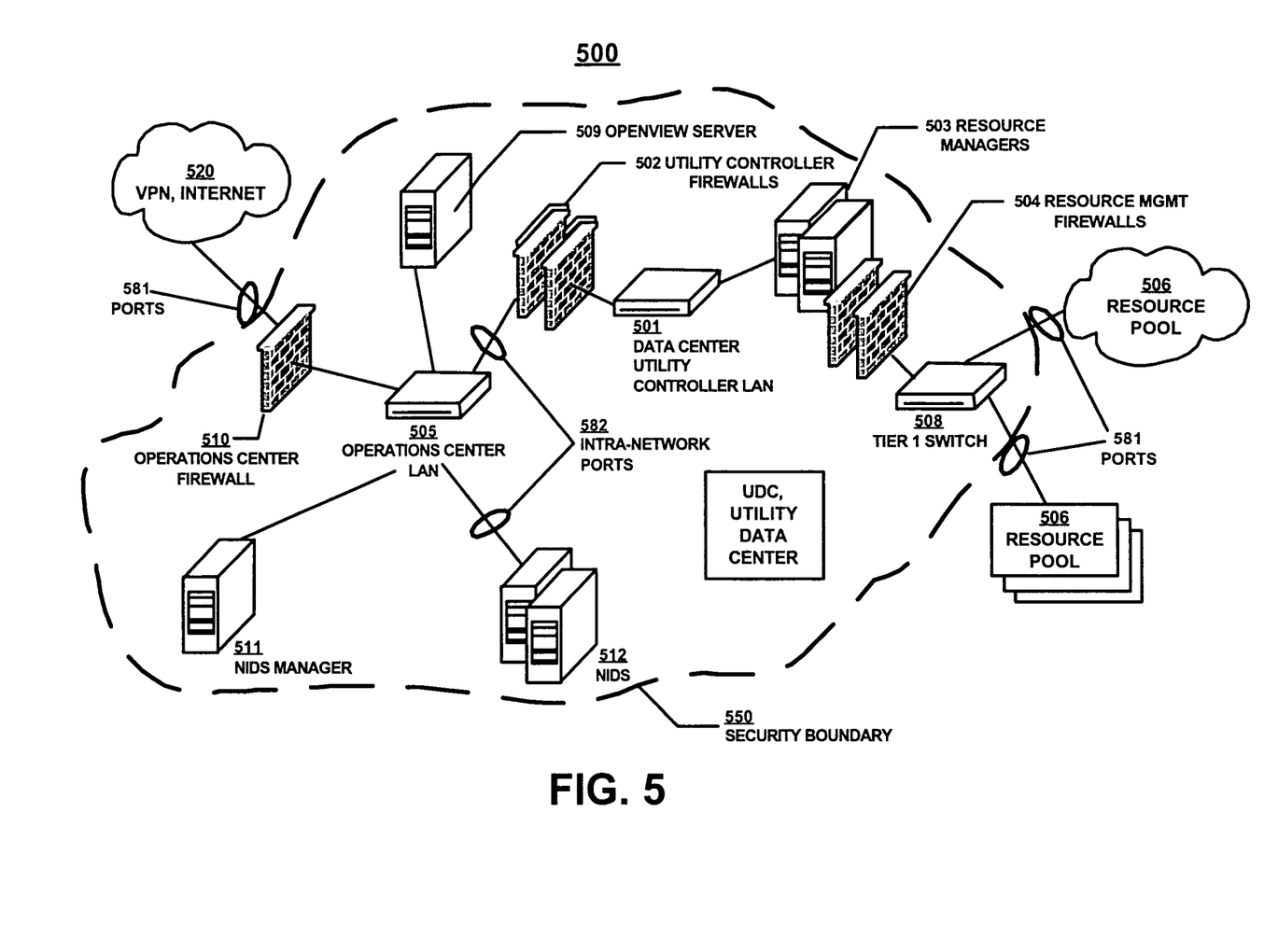
FIG. 5 illustrates a utility data center in accordance with one embodiment of the present invention.

FIG. 5 illustrates an exemplary provisionable network in which embodiments of the present invention can function. Provisional network, or utility data center (UDC), 500 is shown bounded by a virtual security boundary 550. Boundary 550 is shown here only to help illuminate the concepts presented herein. Typical UDC 500 comprises an operations center local area network (LAN) 505, a data center utility controller LAN 501 and resource pools 506. It is noted here that, by their very nature, UDCs are flexible in their composition, comprising any number and type of devices and systems. It is this flexibility from which they derive their usefulness. The specific architecture illustrated in FIG. 5, therefore, is not meant to limit the application of embodiments of the present invention to any particular provisionable network architecture.

Typical UDC 500, in this illustration, communicates with the outside world via the Internet 520 and virtual public networks (VPNs) in the Internet. The communications links that enable this communication are protected by firewall 510. Firewall 510 is shown to illustrate a concept and is not meant to imply any particular method or system of intrusion protection. Many types of hardware and software firewalls are well known in the art and firewall 510 may be either or both.

It is noted here that communications into and out of a provisionable network, as in any network, is accomplished through ports such as illustrated at 581. Communications between devices within a network are also conducted through ports, as alluded to at 582. It is noted that ports are not necessarily physically located at the periphery of a network but are logical end points. External ports 581 and intra-network ports 582 are shown only to help illustrate the concepts presented in embodiments of the present invention. It is also noted that virtual security boundary 550 does not exist in a physical sense. Resources included in the servers and LANs comprising utility data center 500 may include devices and servers located remotely from the other elements of the UDC.

Embodiments of the present invention operate in an environment that distinguishes between three trust domains established in the trust hierarchy of a utility data center. One trust domain is embodied in the Operations Center (OC) LAN 505 where non-critical UDC and other operations-related functions reside. The level of trust is less than the Data Center Control LAN 501. Another trust domain is the data center controller LAN 501 where tasks relating to the automated provisioning of managed resources 506 reside. Access to the Data Center LAN 501 is severely restricted from this domain. A third domain comprises the managed resources LANs where the managed resources 506 reside. These LANs are typically not trusted. It is noted here that clients of the utility data center originate outside the above trust structure and access elements of the UDC via the Internet or a virtual private network (VPN) resident in the Internet infrastructure.

As shown in FIG. 5, operations center (OC) LAN 505 comprises an internal trust domain. Included in OC LAN 505 are manager-of-managers (MoM) server 509, network intrusion detection system (NIDS) 512 and NIDS manager 511. It is noted that, though NIDS 512, NIDS manager 511 are illustrated as computer-like devices, their physical existence is not limited to a particular device. Each may exist as a standalone device or implemented as software resident in a physical device or server.

The heart of the exemplary utility data center illustrated in FIG. 5 is the data center utility controller (UC) LAN, 501. This LAN represents another, higher, internal trust domain. UC LAN communicates through OC LAN 505 and is typically separated from it by various forms of firewalls 502. UC LAN 501 can comprise various numbers of resource managers, such as illustrated at 503. The flexibility inherent in the UDC concept can result in many combinations of resources and resource managers. Resource managers 503 are the typical interface with the various pools of resources 506, communicating with them through ports and some sort of switching network as indicated by the tier 1 switch at 508.

Resource pools 506 are limitlessly flexible, comprising any conceivable combination of data servers, computational capability, load balancing servers or any other device or capability imaginable. Because the possible varieties of resources that can be included in resource pools 506, they are separated from UC LAN 501 by firewalls 504, which, like UC firewalls 502, can be software or hardware or both, in many combinations.

It is noted that embodiments of the present invention can run in many different environments. One network management environment in which an embodiment operates serves as an end-to-end service management infrastructure and is particularly well suited to managing a provisionable network which can also be known as a utility data center (UDC).

In summary, embodiments of the present invention provide methods and systems for automatic verification of a machine-readable map of networked devices. By using an automated process, correctness of a network map can be verified in much less time, at greatly reduced expense, and much more thoroughly than a visual inspection performed by a technician. Moreover, the process can be run repeatedly, at low expense, to allow early discovery of problems. In addition, the automated method not only reports each instance where the network map violates a rule, it also pinpoints the configuration error of the network map, decreasing search time as well as providing a report which may used by any network designer to fix the problem.

Embodiments of the present invention are thus described. While the present invention has been described in particular embodiments, it should be appreciated that the present invention should not be construed as limited by such embodiments, but rather construed according to the following claims.

We claim:

1. A method for automatic verification of a machine-readable map of networked devices comprising:
    accessing a machine-readable map;
    accessing validation rules in a machine-readable format wherein said validation rules comprise a declarations attributing portion providing contextual framework for a definition of said validation rules, a rule attributing portion defining a value of an attribute of a device and a rule connecting portion containing one or more of a clause defining connection requirements of said device;

performing a validation step, wherein said validation step comprises comparing said validation rules in machine-readable format with said machine-readable map; and generating a report of a result of said validation step to provide automatic verification of said machine-readable map of networked devices, wherein said accessing of said machine-readable map does not require accessing said network devices associated with said machine-readable map.

2. The method of claim 1 wherein said machine-readable map comprises:

a network device and its attributes; and a network connection and its attributes, said network connection for connecting to said network device.

3. The method of claim 2 wherein said attributes of said network device are selected from a list consisting of: a make of said device, a model of said device, a type of said device, a role of said device, and a unique identifier of said device.

4. The method of claim 2 wherein said attributes of said network connection are selected from a list consisting of: a unique identifier of a source device, a unique identifier of a destination device, an identifier of a source device's port, an identifier of a destination device's port, and a type of cable used in said connection.

5. The method of claim 4 wherein said type of cable used in said connection is selected from a group consisting of: a power cable, a serial cable, an Ethernet cable, a fibre channel cable, and a SCSI cable.

6. The method of claim 1 wherein said declarations attributing portion is selected from a list of device declarations consisting of: a type of said device, a make of said device, a model of said device, and a role of said device.

7. The method of claim 1 wherein said rule attributing portion that defines said required value for device attributes is selected from a group consisting of: a required attribute with only one valid value, and a required attribute with a value selectable from a set of valid values.

8. The method of claim 1 wherein said rule connecting portion is selected from a group of clauses defining said connection requirements for said device consisting of: a declaration of a type of connection, a requirement for a number of connections, a requirement for a number of destinations for said connection, and a requirement for an attribute of a destination device.

9. The method of claim 8 wherein said requirement for said number of connections is selected from a group of connections consisting of: wherein said number of connections is a single numeric, wherein said number of connections is a range of values, wherein said number of connections is a set of values, wherein said number of connections is a set of ranges, and wherein said number of connections is a set of ranges and values.

10. The method of claim 8 wherein said requirement for said number of destinations for said connection is selected from a group of destinations consisting of: wherein said number of destinations is a single numeric, and wherein said number of destinations is a range of values.

11. The method of claim 8 wherein said requirement for an attribute of said destination device is selected from a group of destination devices requirements consisting of: a particular device type, a destination device type that is read from a set of values, a particular device role, and a destination device role that is read from a set of values.

12. An article of manufacture comprising a data storage device readable by a computer, the data storage device tangibly embodying a program of instructions executable by the computer to perform a method for automatic verification of a machine-readable map of networked devices comprising:

a network map of devices and connections;

a set of validation rules wherein said validation rules comprise a declarations attributing portion providing contextual framework for a definition of said validation rules, a rule attributing portion defining a value of an attribute of a device and a rule connecting portion containing one or more of a clause defining connection requirements of said device; and a validating program, wherein said validating program applies said set of validating rules to said devices and said connections of said network map and generates a message indicating a result of each application of said validating rules wherein accessing of said network map does not require accessing said devices associated with said network map.

13. The article of manufacture of claim 12 further comprising: a report file containing said message generated by said validating program.

14. The article of manufacture of claim 12 wherein said validating program applies said set of validating rules to said devices and said connections of said network map with redundancy.

15. The article of manufacture of claim 12 wherein said set of validating rules are declarations of a requirement for said network map allowing automatic generation of natural language errors.

16. An article of manufacture comprising a data storage device readable by a computer, the data storage device tangibly embodying a program of instructions executable by the computer to perform a method for automatic verification of a machine-readable map of networked devices comprising:

accessing a machine-readable map comprising:

a network device and its attributes; and a network connection and its attributes, said network connection for connecting to said network device, wherein said accessing of said machine-readable map does not require accessing said network device associated with said machine-readable map;

accessing validation rules in a machine-readable format, said validation rules in said machine-readable format comprising:

a declarations attributing portion providing contextual framework for a definition of said validation rules;

a rule attributing portion defining a value of an attribute of said device; and a rule connecting portion containing one or more of a clause defining requirements of connection requirements of said device; performing a validation step, wherein said validation step comprises comparing said validation rules in machine-readable format with said machine-readable map; and generating a report of a result of said validation step.

17. The article of manufacture of claim 16 wherein said attributes of said network device are selected from a list consisting of: a make of said device, a model of said device, a type of said device, a role of said device, and a unique identifier of said device.

18. The article of manufacture of claim 16 wherein said attributes of said network connection are selected from a list consisting of: a unique identifier of a source device, a unique identifier of a destination device, an identifier of said source device's port, an identifier of said destination device's port, and a type of cable used in said connection wherein said type of cable used in said connection is selected from a group consisting of: a power cable, a serial cable, an Ethernet cable, a fibre channel cable, and a SCSI cable.

19. The article of manufacture of claim 16 wherein said declarations attributing portion is selected from a list of device declarations consisting of: a type of said device, a make of said device, a model of said device, and a role of said device.

20. The article of manufacture of claim 16 wherein said rule attributing portion that defines said required value for device attributes is selected from a group consisting of: a required attribute with only one valid value, and a required attribute with a value selectable from a set of valid values.

21. The article of manufacture of claim 16 wherein said rule connecting portion is selected from a group of clauses defining said connection requirements for said device consisting of: a declaration of a type of connection, a requirement for a number of connections, a requirement for a number of destinations for said connection, and a requirement for an attribute of a destination device.

22. The article of manufacture of claim 21 wherein said requirement for said number of connections is selected from a group of connections consisting of: wherein said number of connections is a single numeric, wherein said number of connections is a range of values, wherein said number of connections is a set of values, wherein said number of connections is a set of ranges, and wherein said number of connections is a set of ranges and values.

23. The article of manufacture of claim 21 wherein said requirement for said number of destinations for said connection is selected from a group of destinations consisting of: wherein said number of destinations is a single numeric, and wherein said number of destinations is a range of values.

24. The article of manufacture of claim 21 wherein said requirement for said attribute of said destination device is selected from a group of destination device's requirements consisting of: a particular device type, a destination device type that is read from a set of values, a particular device role, and a destination device role that is read from a set of values.

25. A data center comprising:
   a plurality of devices; with each device represented in a machine-readable map; and
   a plurality of connections coupling said plurality of devices, wherein a validating program applies a set of validating rules to said plurality of devices by comparing said validation rules in a machine-readable format with said machine-readable map wherein said validation rules comprise a declarations attributing portion providing contextual framework for a definition of said validation rules, a rule attributing portion defining a value of an attribute of a device and a rule connecting portion containing one or more of a clause defining connection requirements of said device and said plurality of connections of said machine-readable map generates a message indicating a result of each application of said set of validating rules, wherein accessing of said machine-readable map does not require accessing any of said plurality of devices associated with said machine-readable map.

26. The data center of dam 25 further comprising: a report file containing said message generated by said validating program.

27. The data center of claim 25 wherein said validation program applies said set of validating rules to said plurality of devices and said plurality of connections of said machine-readable map with redundancy.

28. The data center of claim 25 wherein said set of validating rules are declarations of a requirement for said machine-readable map allowing automatic generation of natural language errors.

\* \* \* \* \*

UNITED STATES PATENT AND TRADEMARK OFFICE
CERTIFICATE OF CORRECTION

PATENT NO. : 8,463,879 B2  Page 1 of 1
APPLICATION NO. : 10/893617
DATED : June 11, 2013
INVENTOR(S) : David Graves et al.

It is certified that error appears in the above-identified patent and that said Letters Patent is hereby corrected as shown below:

In the Claims:

In column 16, line 24, in Claim 26, delete "dam" and insert -- claim --, therefor.

Signed and Sealed this
Seventeenth Day of September, 2013

Teresa Stanek Rea
*Deputy Director of the United States Patent and Trademark Office*